United States Patent [19]

Thackston et al.

[11] 4,113,080

[45] Sep. 12, 1978

[54] TORQUE WRENCH AIR SHUT-OFF

[75] Inventors: Clyde David Thackston; Robert H. Alexander, both of Columbia, S.C.

[73] Assignee: Rockwell International Corporation, Pittsburgh, Pa.

[21] Appl. No.: 811,423

[22] Filed: Jun. 29, 1977

Related U.S. Application Data

[63] Continuation of Ser. No. 686,085, May 13, 1976, abandoned.

[51] Int. Cl.[2] .............................................. F16D 43/20

[52] U.S. Cl. ...................................... 192/150; 60/409; 173/12

[58] Field of Search ............. 192/150, 129 B; 60/403, 60/407, 409; 173/12

[56] References Cited

U.S. PATENT DOCUMENTS

| | | | |
|---|---|---|---|
| 2,927,672 | 3/1960 | Banner | 192/150 X |
| 3,162,250 | 12/1964 | Sindelar | 192/150 X |
| 3,174,559 | 3/1965 | Vaughn | 192/150 X |
| 3,195,704 | 7/1965 | Linsker | 192/150 |
| 3,955,662 | 5/1976 | Thackston | 192/150 |

*Primary Examiner*—Edgar W. Geoghegan

[57] ABSTRACT

A power tool for setting fasteners to a predetermined torque, having a novel shut-off means that automatically shuts off the power supply at a predetermined torque, but will not "hang up" in the off position.

7 Claims, 5 Drawing Figures

TORQUE WRENCH AIR SHUT-OFF

This is a continuation of application Ser. No. 686,085, filed May 13, 1976, now abandoned.

BACKGROUND OF THE INVENTION

This invention is a novel shut-off means for a hand-held torque tool that cures a deficiency of previous shut-off mechanisms. Prior to this invention, shut-off of the tool has been accomplished using cams to release a cocked mechanism. This cocked mechanism is used to hold open a valve in the power supply circuit to the tool motor. The cams have usually been actuated by relative movement between the motor spindle and the output spindle upon reaching the desired torque. In prior art mechanisms, the relative movement was usually through a spring arrangement that would restore the elements to their initial operating positions upon shut-off. Thus, the cam arrangement would be restored to its initial operating position. One of the inventors named in this case has developed a novel clutch for use in a torque wrench which also allows relative movement between the drive spindle and the output spindle when proper torque is achieved, but does not restore these elements to the initial position. Accordingly, the possibility exists that the cam can stop with its high point in the position for shut-off. When the cam is in that position, the shut-off mechanism cannot reset, but is automatically pushed immediately to the off position upon re-engagement of the output spindle with a fastener. This novel clutch and two prior art shut-off mechanisms are shown and described in U.S. patent application Ser. No. 534,236, filed Dec. 19, 1974 now U.S. Pat. No. 3,955,662 issued May 11, 1976 to which reference is made for a more complete understanding of the clutch operation and the prior art shut-offs.

It is a principal object of this invention to provide a positive, accurate shut-off means for a powered torque wrench.

It is a further object to provide a shut-off means that is responsive to the torque setting in the tool to automatically produce a cessation of the operation of the tool.

It is a further object to provide a shut-off means that will not "hang up" in the off position, which would prevent repetitive operation of the tool.

It is a further object to provide a shut-off means that will limit clutch wear and heating by producing a cessation of operation of the tool immediately upon reaching the set torque.

Another object of this invention is to provide a shut-off mechanism that is relatively straightforward in operation, easy to maintain, and economical to construct.

SUMMARY OF THE INVENTION

This invention is directed to a shut-off mechanism which utilizes a cam surface to store energy in a spring, which, when the shut-off point is reached, is released to operate a "firing pin" to interrupt the supply of power to the motor of the tool. This is accomplished by using overtravel of the firing pin to trip a latch mechanism to release a shut-off valve. The use of overtravel insures against the tool hanging up on a high point of the cam. The clutch slips upon reaching the set torque and will not over torque no matter how long it is allowed to slip. However the shut-off mechanism terminates this slip quickly thus saving clutch wear.

DESCRIPTION OF THE INVENTION

Figures 1, 2:
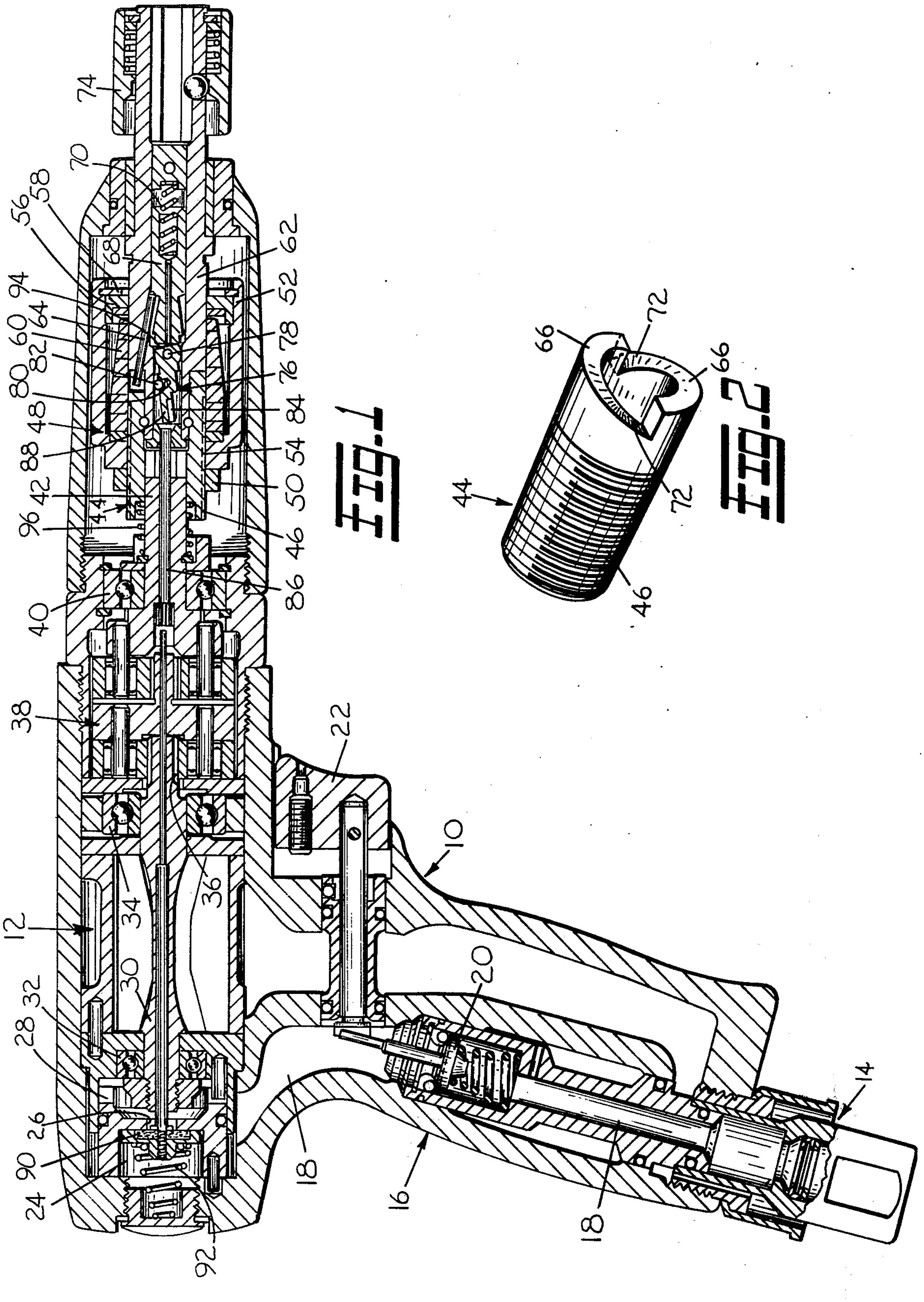
FIG. 1 is a longitudinal sectional view of a pneumatic wrench containing one embodiment of the invention.
FIG. 2 is an elevation view of the input drive spindle, showing the cams on the end face.
Figure 3:
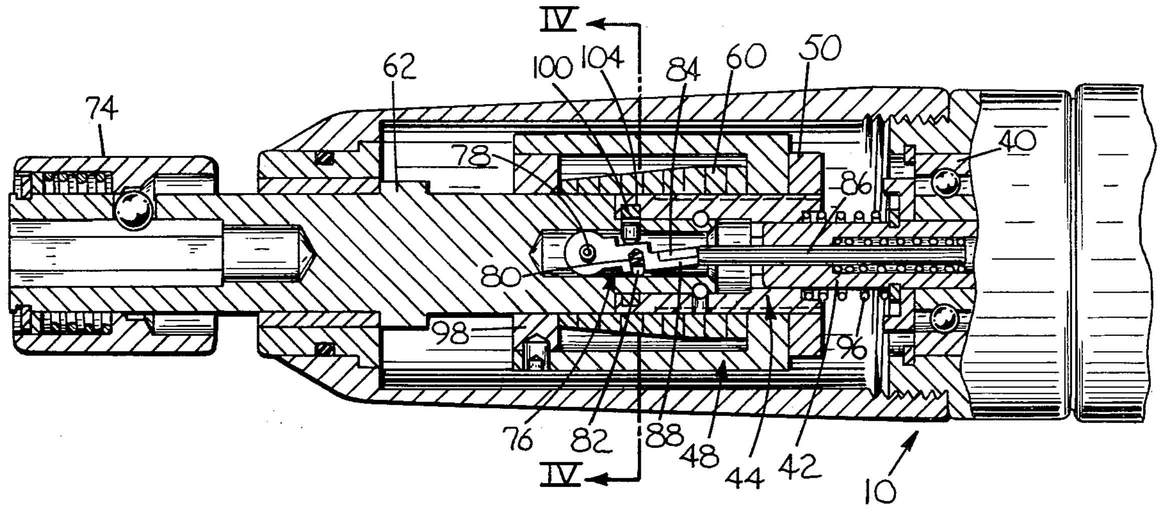
FIG. 3 is a view of a portion of the tool of FIG. 1, with another shut-off embodiment shown.
Figure 4:
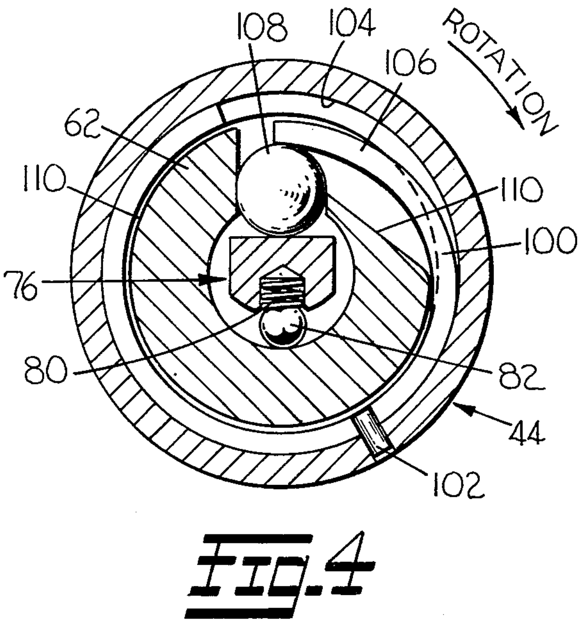
FIG. 4 is a section along the line IV—IV of FIG. 3.
Figure 5:
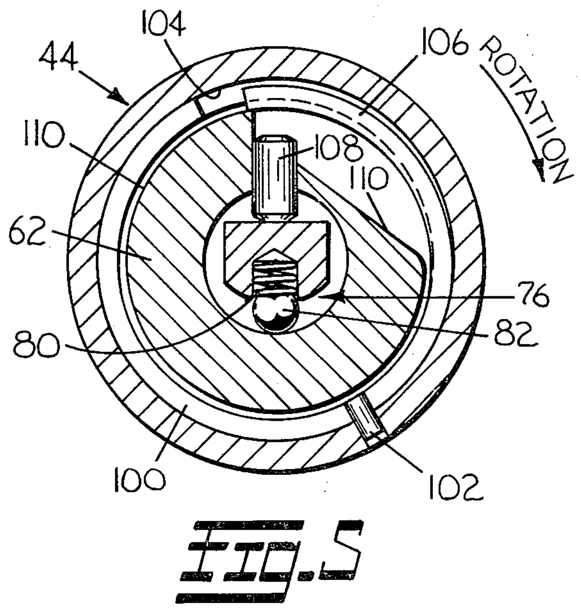
FIG. 5 is a view similar to FIG. 4, with the spring in the cocked position, ready to be released to shut-off the tool.

Two embodiments of the invention are herein described. One, shown in FIG. 1, is generally referred to as the axial embodiment, because the spring and firing pin are positioned and act along the longitudinal axis of the tool. The other is referred to as the radial embodiment, and is shown in FIGS. 3, 4 and 5. In this embodiment, the spring is moved radially outwardly by the cam and snaps radially inwardly, moving the firing pin radially also. The axial embodiment will be described first.

FIG. 1 shows a pneumatic nut runner 10, of the "pistol grip" type, having a conventional fluid motor 12 mounted therein as the driving means. Fluid is furnished via a hose (not shown) connected to an inlet 14 at the bottom of the handle 16. Passages 18 and a control valve 20 operated by a trigger 22 admit fluid to a chamber 24 at the rear of the tool body. From this chamber 24, fluid flows through opening 26 and passages 28 to motor 12. All the above is conventional and well-known in the art. The motor shaft 30 is supported upon bearings 32 and 34, and is of conventional construction. The output end of the motor shaft carries integral gear teeth 36 which mesh with the input of a planetary (double) gear reduction unit 38. The output shaft of the gear reduction unit is journalled on a bearing 40, and has a non-circular configuration on its outer end 42, for slidably meshing with input drive spindle 44. Input drive spindle 44 is internally configured (either splined or hexagon or the like) to match the output shaft of the gear reduction unit, so that it is slidable axially, but rotates with the output shaft. Spindle 44 is externally threaded at 46 with left-hand threads to accept a torque adjusting nut 48 and lock nut 50. Torque adjusting nut 48 has an elongated body 52 with a threaded portion 54 at one end and a spacer 56 and retaining ring 58 seated in the other end, and encloses coil spring 60. Spring 60 (right-hand wound) fits tightly on input drive spindle 44 and also fits tightly around an output drive spindle 62. This spring 60 has a constant inside diameter in the relaxed condition and this diameter is very slightly smaller than the outer diameter of input spindle 44 and output spindle 62. Spring 60 has the outer diameter of its coils machined in a taper, with the small end on the output spindle. Torque adjusting nut 48 is threaded on input spindle 44 and, by adjusting the position of nut 48 on spindle 44, positions spring 60 axially along the input spindle. Torque adjusting nut 48 is retained in the desired position by lock nut 50.

All the foregoing is more completely described in the abovementioned Ser. No. 534,236, filed Dec. 19, 1974, and assigned to the assignee of the present invention. Reference is directed to this application for a more complete explanation of the clutch operation.

The present invention is particularly concerned with a novel means for shutting off the supply of power to the motor when the present torque is reached, but without stalling the tool in the off position. There is a shut-off valve in the line between the manual control valve and the motor, which is kept open until the preset torque is reached, at which time the stored energy in a spring is released to close the valve. The spring, however, utilizes overtravel, or a "snap" beyond its normal relaxed position, to actuate the shut-off, so that the tool will not stop with the valve actuation in the off position. In its relaxed position it does not bear against the release member.

There are two types of spring actuation shown here, axial and radial. The first of these, shown in FIGS. 1 and 2, utilizes a pin 64 riding cam faces 66 on the end of input drive spindle 44 to move a "firing pin" 68 against the bias of spring 70. As shown in FIG. 1, when the tool is at rest, the bottom (or low point) 72 of cam faces 66 is dimensioned to be just shy of contacting pin 64. When the tool is to be operated, the nosepiece 74, with the desired wrench or tool bit (not shown) attached, is pushed against the workpiece (also not shown). This moves the nosepiece 74, output spindle 62, and input spindle 44 slightly inwardly. A release member 76 is pivotally mounted on output spindle 62 by means of a pin 78. This release member 76 is normally urged to a cocked, or set, position by a small transverse spring 80 and a ball 82 riding on the inner wall of output spindle 62. The end of the release member is notched, as at 84, to allow forward movement of push rod 86, but in its cocked position the release member is held such than an end 88 of release 76 will engage the end of the rod, and open valve member 90. Tripping the release member 76 (moving it clockwise as seen in FIG. 1) allows spring 92 to bias valve member 90 closed, shutting off the air to the motor.

All the preceding pertaining to the release member 76, push rod 86 and valve 90 is also described in the abovementioned Ser. No. 534,236. The improvement is in the shut-off means provided, which operates as follows: as the tool operates, operator pressure upon it keeps release member 76 engaged with push rod 86 holding valve 90 open against the bias of spring 92. Upon reaching the preset torque level, the tool bit, nosepiece and output drive spindle 62 (which carries pin 64 and firing pin 68) slows or halts its rotation, while the tool driving mmembers up to spring 60 continue to rotate, including input spindle 44. As the input spindle rotates, pin 64 rides up one of the cam faces 66, moving pin 64 and firing pin 68 to the right as seen in FIG. 1, against the bias of spring 70. After input spindle 44 has rotated the cam face past the high point of the cam, spring 70 is suddenly released and drives firing pin 68 against a bottom surface 94 of release member 76 which has been formed to coact with firing pin 68 to rotate the release member clockwise under this impetus caused by the energy released from spring 70. This allows push rod 86 to move to the right (as seen in FIG. 1), closing valve 90. This shuts off the tool, even though the operator may still keep valve 20 open.

Upon the completion of the travel of firing pin 68 to the left as seen in FIG. 1, the firing pin 68 assumes a rest position as shown in FIG. 1, almost (or just barely) touching release member 76 when the release member has returned to the set position. This is accomplished when the operator withdraws his pressure on the tool after shut-off. At that time, a spring 96 interposed between bearing 40, which is fixed in the housing, and input drive spindle 44, moves the assembly of the input spindle, torque assembly, output spindle, nosepiece and tool bit outwardly, or to the right as seen in FIG. 1. This allows spring 80 to move release member 76 counterclockwise about pin 78, and in the position shown in FIG. 1, ready to contact push rod 86 upon engagement with another fastener. Upon engagement, the release member 76 and firing pin 68 move together inside output spindle 62, so they retain the same relative positions until movement of input spindle 44 relative to the output spindle causes energy to be stored in spring 70.

The above description pertains to the embodiment shown in FIGS. 1 and 2. The other embodiment, shown in FIGS. 3, 4 and 5, insofar as it differs from the first embodiment, will now be described. Where the same parts are shown, like numbers will be used.

FIG. 3 shows the nose portion of the tool of FIG. 1, with a portion of it in section to show the radial embodiment. The operation of the tool is the same as the previous embodiment, namely, the trigger and a push on the fastener are utilized to start the flow of fluid to the motor, and the motor is coupled through double reduction planetary gearing to the output 42 of the gear unit. This in turn is coupled to the input drive spindle 44, and the spring 60 couples the input spindle to output spindle 62. The structure of torque adjusting nut 48 is slightly different, having an end cover 98 retained in the end of the nut by a retainer screw 100. This is merely an assembly detail, however, and is not essential to this invention.

As in the first embodiment, pushing on the fastener moves output spindle 62 and release member 76 inwardly (to the right in FIG. 3) until the release member opens valve 90 by means of push rod 86, allowing the motor to operate. The embodiment of FIG. 3, however, uses a band-type spring member 100 fixed to rotate with input drive spindle 44 by a pin 102. Spring 100 is mounted in a groove 104 on the inner bore of input drive spindle 44. As seen in FIG. 4, the trailing end 106 of spring 100 when at rest (relaxed) lies on firing pin 108, which in turn just contacts release member 76. In FIG. 4, the firing pin 108 is shown as a ball-shaped member while in FIG. 5, it is shown as a cylindrical plug-shaped member, merely to emphasize that the dimension measured from spring 100 to release member 76 is the only critical quality necessary to the firing pin 108.

The operation of this embodiment results when the preset torque is reached, and the output spindle 62 ceases to rotate with the input spindle 44, as in the first embodiment. When this happens, spring 100, being constrained to rotate with input spindle 44 by pin 102, rotates clockwise as seen in FIGS. 4 and 5. FIG. 4 shows the relative positions of the elements during the fastener tightening process — trailing end 106 resting on firing pin 108, but exerting no inward force upon it. Upon reaching the desired torque, as stated above, output spindle 62 slows or stops rotating relative to input spindle 44. Input spindle 44 continues to move clockwise, carrying spring 100 with it. Upon trailing end 106 contacting cam surface 110 of output spindle 62, the spring 100 is opened outwardly. This "cocks" spring 100, and this configuration is held through one revolution of input spindle 44 relative to output spindle 62. FIG. 5 shows the relative positions of the elements just before trailing end 106 leaves the cam surface 110. Immediately after this condition, trailing end 106, with its stored energy, is released by cam surface 110 and snaps inwardly, driving firing pin 108 into release member 76. Release member 76 is driven clockwise as viewed in FIG. 3 (downwardly in FIG. 5) against the bias of spring 80, allowing push rod 86 to move to the left, closing valve 90 (FIG. 1).

Thus it can be seen that relative rotation between the input spindle and output spindle operates to store energy in a spring, and to release the energy to shut-off the tool, without stopping in a position where the tool remains shut-off.

We claim:

1. In a power operated tool for setting fasteners and the like to a predetermined torque, said tool having a motor connected to rotate a drive shaft, said drive shaft being connected to the tool output through a torque-responsive coupling, said tool having a normally-closed valve in the line for supply of power to said motor, and said normally-closed valve being initially opened by engagement of said tool with a workpiece, the improvement comprising a shut-off means responsive to relative rotation between said drive shaft and said tool output to allow said valve to close, in which initial relative rotation between said drive shaft and said tool output arms said shut-off means to sense a predetermined magnitude of relative rotation and in which further relative rotation triggers said shut-off means to actuate said valve to interrupt the supply of power to said motor.

2. The power operated tool of claim 1, in which a spring encircles a portion of said tool output, and is constrained to move with said drive shaft during relative movement.

3. The power operated tool of claim 1, in which a coil spring is mounted longitudinally in said tool output, and is biased by a pin and cam means on the end of said drive shaft.

4. The power operated tool of claim 2, in which said biasing of said spring is effected by a cam surface on said tool output.

5. A manually operable power tool comprising a motor, operator control means for control of power to said motor, automatic shut-off means for interrupting the supply of power to said motor, said shut-off means remaining operable after initial automatic actuation until interruption of power by said operator control means, an adjustable torque-limiting assembly for transmitting torque to the output shaft of said tool, said torque-limiting assembly having a driving spindle connected to the output of said motor, an elongate driven spindle conected to said output shaft, said driven spindle being coaxial with and abutting said driving spindle, adjustable coupling means coupling said driving and driven spindles, and means connecting said torque-limiting assembly and said automatic shut-off means, said connecting means responsive to relative rotation of said driving spindle and said driven spindle to store energy in a spring, and effective upon further relative rotation to release said energy to actuate said shut-off means.

6. The power tool of claim 5, wherein said connecting means includes a cam surface on said driving spindle, a pin substantially longitudinally movable in said driven spindle, one end of said pin adapted to be contacted by a substantial portion of said cam surface and the other end of said pin adapted to bear against a firing pin axially movable in said driven spindle, said firing pin being spring-biased toward said automatic shut-off means, whereby said cam surface moves said pin during relative movement of said driving and driven spindles, storing energy in said spring and subsequently releasing said spring energy to thereby actuate said automatic shut-off.

7. The power tool of claim 5, wherein said connecting means includes a cam surface on said driven spindle, an actuator member received in a recess of said driven spindle, a spring member contained within a recess of said driving spindle and constrained to rotate therewith, whereby, upon relative rotation between said driven spindle and said driving spindle, said cam surface moves said spring to an energy-stored condition, and further relative rotation releases said spring to thereby actuate said shut-off means through said actuator member.

* * * * *